Oct. 11, 1966 C. E. PFUND 3,278,895
AUTOMOBILE SIGNALLING
Filed Jan. 20, 1964
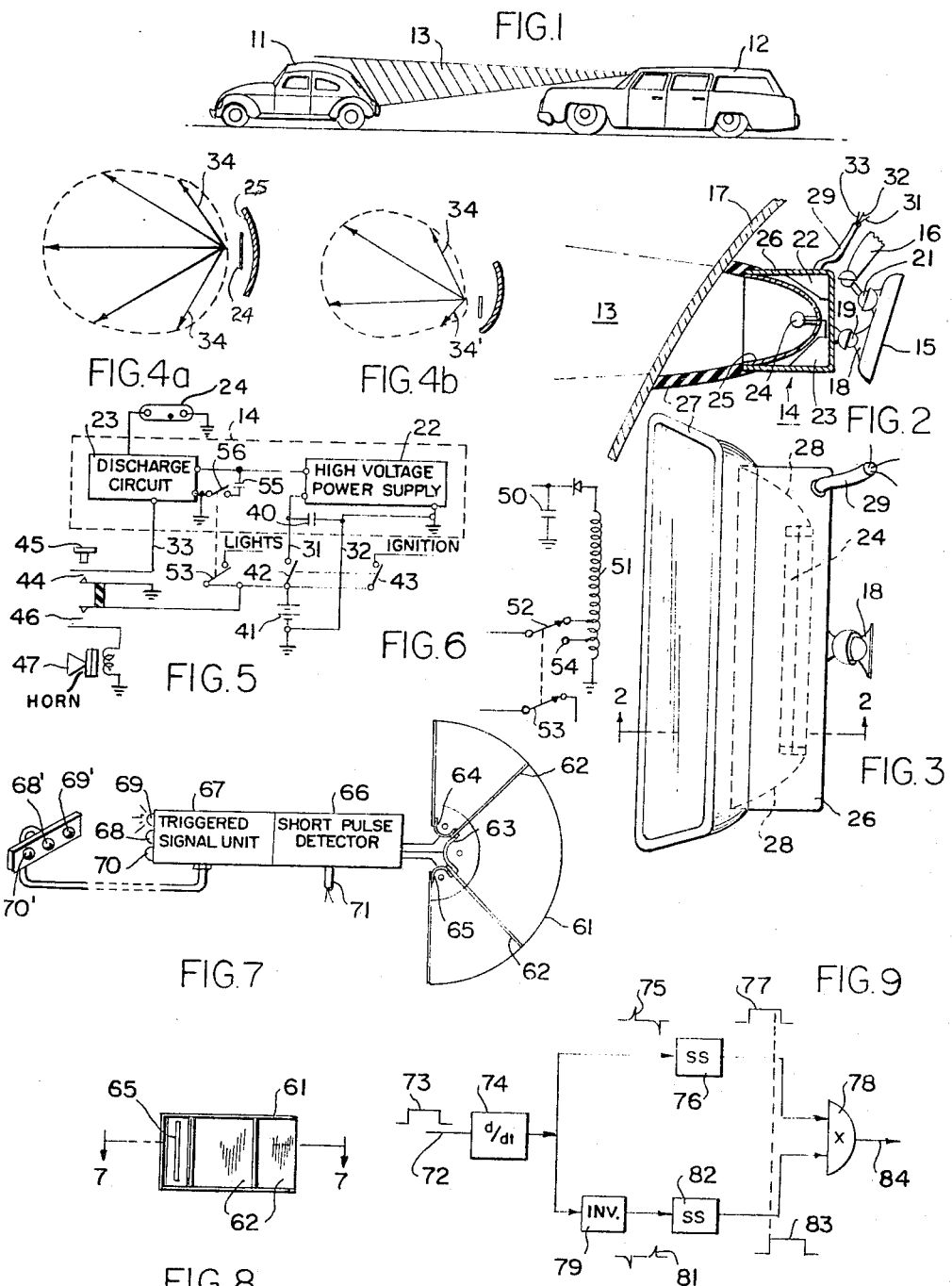
INVENTOR.
CHARLES E. PFUND
BY
Russell, Chittick & Pfund
ATTORNEYS United States Patent Office 3,278,895
Patented Oct. 11, 1966

3,278,895
AUTOMOBILE SIGNALLING
Charles E. Pfund, 16 Balcarres Road, West Newton, Mass.
Filed Jan. 20, 1964, Ser. No. 339,019
5 Claims. (Cl. 340—34)

This invention relates to light signalling systems and more particularly to improved method and apparatus for signalling between automobiles.

It is well known that the alternate switching between the high and low headlight beams of an automobile is effective to a limited extent during night-time driving for signalling between automobiles. In an effort to extentd the usefulness of this signalling system, it has been proposed to provide receivers at the rear of each automobile whereby the headlights from a following automobile can be detected during daylight hours for the purpose of providing a signal which is useable under all driving conditions. Examples of receivers of this type are found in the patents to Gourdou, 2,771,594, and Gagnaire, 2,578,-347, where the characteristics of the receivers are especially adapted to be able to detect the headlight radiation from the following car.

Signalling from vehicles with modulated or continuous light beams has also been proposed for control purposes. For example, the patent to Sheppard, 2,355,607, shows a source of modulated visible light which is transmitted to a receiver in order to provide a reliable light beam signalling system from the transmitting vehicle to the receiver. The system of Sheppard is particularly adapted to be used on emergency vehicles by providing the modulated light transmitter thereon for controlling traffic signals which are controlled in response to the reception of the modulated light signal by a suitable receiver. A light source such as that of FIG. 5 in the Sheppard Patent, although modulated, would be visually continuous and, hence, incapable of being used at high intensity for normal traffic vehicle without objectionable visual response in drivers of oncoming traffic.

Normal traffic flow under present-day conditions would benefit from a simple and reliable signal by which each driver could apprise other vehicles of the presence of his vehicle. Examples of the need for such a signal include encounters with vehicles in the direction in which the driver is moving to indicate that some maneuver other than a normal continuation of his present line of traffic is intended, or to warn such other vehicle which is changing course that the indicated change presents a possible dangerous conflict with the signalling vehicle. Although most automobiles are now equipped with a horn for producing an audible signal of an emergency nature, most drivers do not use the horn unless necessary because of its annoying effect on other drivers.

Signalling with the high beams of the headlights during night-time driving is of limited benefit and provides an annoying distraction due to the intensity and duration of even a brief switching to the high beams. This annoyance amounts to actual danger for the oncoming traffic which receives the full brilliance of the high beams directly in the visual reception pattern of the driver of the oncoming vehicle. Even with the brightness of the high beams normally employed in automobiles, this signalling system is generally ineffective during day-light hours. On the other hand, the equipping of vehicles with brilliant substantially continuous lights or lights which are repeatedly flashing is extremely dangerous due to the blinding effect of such lights and, in fact, is prohibited by law in many states due to the reservation of particular flashing lights and colors to designate emergency vehicles.

While it has been proposed to provide complete signalling systems by having a transmitter and a receiver for radio, light, or sound signals in all vehicles, such schemes have not been adopted due to the requirement for universal installation of such equipment and the standardization of signals which would be required in order to assure that all traffic was capable of receiving the signals from all other vehicles. Such universal acceptance can only generally be achieved by legislation making such equipment mandatory; and, as much as this may seem to be desirable to safety engineers and those concerned with reducing the accident toll in injuries and damage to property, the adoption of such legislation will be some time in the future.

It is the object of the present invention to provide an improved method and apparatus for signalling which can be installed in automobiles and used without any of the disadvantages or objectional features of the foregoing systems. In particular, the method of the present invention provides for signalling from any automobile equipped with a suitable light transmitter in a manner which can be perceived by the drivers of vehicles in the traffic encountered by the transmitting vehicle under substantially all conditions of ambient light, except possibly the most brilliant conditions of sunlight. The light signal of the present invention is effective both day and night without producing any objectional visual response in the drivers of oncoming traffic even though the signal is directed so that it is concentrated in their general direction. With this method, substantially universal utility is obtained for the individual cars equipped with a suitable light transmitting apparatus, since the method produces a stimulus that all drivers perceive without special detection equipment. Thus, those drivers who are interested in the additional safety that such a signal provides will receive full benefit from its use without any requirement for cars universally to be equipped with a light receiver for detecting the light signal transmission.

The seemingly inconsistent objectives of providing a luminous signal which is visually perceivable in daylight hours and yet not capable of producing blinding effects for oncoming traffic during night-time driving is achieved by employing an extremely high intensity of light which is flashed a single time or a series of times by the driver of the signalling vehicle with the duration of each flash being extremely short and the timing between successive flashes, if multiple flashes are employed, being long enough so that any visual persistence between successive flashes is negligible. In particular, the intensity of the light flashes is so high that the interior of the signalled car is actually illuminated relative to the ambient daylight, and the flash is thus perceived by the driver of that car without requiring that he be actually alerted to receive the signal by viewing the signalling car in his rear-view mirror or such other restrictive conditions. On the other hand, the duration of the flash of light is relatively short and preferably of the order of 1/500 second or shorter; such short duration flashes are found to produce very little persistent visual response or blinding effect in human vision even when viewed directly at reasonable distances. Thus, flashing such a signal when oncoming traffic is facing directly into the beam does not produce a blinding effect in the drivers of oncoming traffic even at night when the eye is dilated. The absence of blinding effect is achieved even though the intensity of the actual light flash is extremely high and, in fact, high enough to be perceived by the driver in a vehicle ahead of the signalling vehicle during daylight hours with that driver actually facing away from the direction from which the flash is coming; i.e., the normal relation of two cars moving in the same lane of traffic in the same direction.

Another object of the invention is to provide improved method and apparatus for signalling from an automotive vehicle under normal driving conditions, thereby to provide a signal which is instantly available during operation of the vehicle with a high reliability of detectability of such signals which are selectively transmitted under the control of the driver of each vehicle.

A further object of the invention is to provide complete signalling systems including light pulse receiving systems with indicators for making infallible reception of light pulses transmitted by other vehicles.

These and other objects of the invention will be apparent from the following detailed description taken in conjunction with the accompanying drawings wherein:

FIG. 1 is a side elevation view of two automobiles in a normal traffic configuration;

FIG. 2 is a side elevation partly in section of a device in accordance with the invention installed in an automobile;

FIG. 3 is a plan view of the device of FIG. 2;

FIGS. 4a and 4b are horizontal light distribution patterns for two forms of the apparatus shown in FIG. 3;

FIG. 5 is a diagram, partly schematic, of the electrical arrangements in accordance with the invention;

FIG. 6 is a partial schematic diagram of a modification;

FIG. 7 is a plan view of a columnated receiving apparatus and associated equipment in accordance with the invention;

FIG. 8 is a side elevation view of the columnated receiving apparatus of FIG. 7; and FIG. 9 is a block diagram of a short pulse recognition circuit useful with the invention.

The diagram of FIG. 1 shows a forward automobile 11 and a following automobile 12 disposed in a normal traffic encounter situation in which both of the automobiles 11 and 12 are moving in the same direction in the same or adjacent traffic lanes. In the normal flow of traffic, the need for the automobile 12 to signal automobiles in the position of the car 11 arises frequently, especially when the car 12 intends to accelerate, pass, turn, or otherwise alter the equilibrium conditions of normal traffic flow. In this respect, it will be understood that the car 12 will likewise at times want to signal a car in the position of car 11 when the forward car 11 is entering or leaving the traffic lanes or altering its position therein. In order to accomplish this signalling, the present invention provides for a concentrated beam of light 13 to be transmitted from the car 12 forwardly in a region in which is bounded by the horizontal limits which the forward traffic 11 normally occupies and has a horizontal distribution pattern as hereinafter described.

FIG. 2 shows one arrangement which is convenient for mounting a light transmission unit 14 to transmit the forward beam 13 in accordance with the invention. In the arrangement shown, the unit 14 is movably supported behind a normal rear-view mirror 15 which is adjustably mounted on a support 16 in the region near a portion of the windshield 17 of the automobile. As shown in FIG. 2, unit 14 is attached to the rear surface of the mirror 15 by means of a suction cup 18 and supported by a ball joint 19 to be adjustable relative to the position of the mirror 15. Thus, the beam 13 can be transmitted forwardly through the windshield 17 in an adjusted position irrespective of the adjusted position of the mirror 15 which is also usually supported by a ball joint 21.

The unit 14 comprises a high-voltage power supply 22 and a discharge circuit 23 for energizing a gaseous discharge lamp 24. The lamp 24 is located at the focus of a suitable parabolic cylinder 25 for forming the beam 13 in the desired horizontal and vertical distribution. The entire apparatus is enclosed in a suitable casing 26, and the forward portion is surrounded by an opaque bezel 27 to confine the light transmitted to the portion of the windshield 17 within the bezel 27, and avoid reflection of light within the car.

The general arrangement of the parts described for FIG. 2 are shown in the plan view in FIG. 3 and include side reflectors 28 for suitably modifying the horizontal distribution pattern of the light as desired. The unit 14 is energized by a suitable three-conductor cable 29 which provides to the unit 14 a ground connection 31, a battery voltage connection 32, and a triggering switch closure connection on lead 33.

The horizontal distribution pattern of the light is shown in FIG. 4a to be symmetrical with respect of the center line of the automobile and in addition to the maximum response directly ahead includes substantial responses at 34 to provide a useable amount of light output when two cars are in passing configuration. The relatively high intensity levels 34 greatly enhance the detectability of the flash when the rear vehicle 12 is in the so-called "blind-spot" of the vehicle 11. In certain circumstances, it may be desirable to modify the distribution of light as shown in FIG. 4b by off-setting the reflector 25 to suppress the left intensity ray 34' for two-way traffic lanes which follow the right lane convention.

Referring now to FIG. 5, the circuit features of the unit 14 will be described. In general, the power supply 22 and the discharge circuit 23 of the unit 14 utilize techniques generally well understood in the construction of electronic flash photographic devices. These devices employ low voltage direct current from a battery which is converted into high voltage direct current for charging a discharge capacitor and a trigger circuit responsive to a switch closure to discharge the capacitor through a krypton-xenon discharge path at low pressure for generating a high-intensity, short-duration flash of blue-white light which is generally equivalent to daylight for photographic purposes. Accordingly, further details of the circuits 22 and 23 will not be described herein. The unit 14 is energized by current from the automobile low voltage electrical supply, including a battery 41 which is connected by leads 31 and 32 to the power supply 22 upon closure of a switch 42 which is ganged with a switch 43 normally associated with the ignition system of the automobile. Thus, the unit 14 is ready for operation shortly after the ignition switch 43 is closed to start the engine of the automobile. Since the high voltage power supply 22 will generally contain a transistor oscillator to convert the D.C. supply to high voltage A.C., it may be necessary to provide a by-pass capacitor 40 within the unit 14 to eliminate the long leads 31 and 32 from the oscillator circuit.

The flash of light from the unit 14 is produced selectively and at will by the driver of the vehicle by closing a trigger switch 44 which grounds lead 33. As shown, the switch 44 is arranged to be actuated by slightly depressing horn button 45 with normal horn contacts 46 closed by additional depression of the horn button 45. Thus, the light signal resulting from closure of the switch 44 can be followed immediately by the emergency signal from horn 47 if such a signal is needed. Of course, the switches 44 and 45 could be closed by separate actuators if the combined feature just described is not desired.

Due to the wide range of ambient light conditions normally encountered, it may be desirable to provide increased light output from the device 14 for daylight conditions. This can be accomplished by increasing the energy stored either by adding capacitance or increasing the voltage of the high voltage supply 22. Thus, as shown in FIG. 6, a switch 52 in the primary of a step-up transformer 51 of the supply 22 can be used to provide two different turns ratios and, hence two different high-voltage outputs. The switch 52 is shown ganged for operation with a switch 53 which is the normal headlight control switch for the automobile. When the switch 53 is open as in daylight conditions, the switch 52 moves to its lower position 54 to increase the turns ratio of the transformer 51 and increase the light output of the unit 14. Conversely, at night when the headlight switch 53 is normally closed, the switch 52 moves to the upper contact and reduces the high-voltage output to storage capacitor 50. An alternate arrangement for providing two levels of light output is shown in FIG. 5. The discharge circuit 23 contains a high-voltage storage capacitor which can be augmented by an additional capacitor 55 connected in parallel with the capacitor in the circuit 23 by means of a switch 56. As in FIG. 6, the switch 56 may be ganged for operation with the headlight switch 53. It will be understood that the ganged operation with the normal ignition switch 43 and headlight switch 53 can be accomplished with relay controlled switching if desired and the indicated physically ganged switches is merely illustrative of the function to be performed.

Referring to FIG. 7, a light pulse receiver device suitable for being positioned in the rear of an automobile is shown. The receiving device includes a semi-circular baffle 61 which is separated by a plurality of radial baffles 62 to form a columnated receiver having three channels communicating with three separate photodetectors 63, 64, and 65. The three detectors, 63, 64, and 65, supply input signals to a three-channel short pulse detector 66. The three channels of the detector 66 operate respective indicators in a signal unit 67, which indicators may be flashing lamps 68, 69 and 70. The indicators may also include a remote indicating panel having lamps 68', 69', and 70'.

The operation of the light detector of FIG. 7 provides directional indications to the driver by making the lamp indicators different colors: red, white, and green, for example, with the respective indicators 68, 69, and 70, or 68', 69' and 70', indicating which of the photodetectors 63, 64, or 65 has received a short light pulse. The columnating assembly 61 may conveniently be located to receive light entering the rear window of the automobile, and the unit can be energized from the automobile battery by means of cable connection 71.

FIG. 8 shows the columnated receiver 61 in side elevation. As will be apparent from this structure, the photocell 63 will be energized by light flashes from cars directly behind the receiver unit. Photodetectors 64 or 65 will be energized by flashes from cars to the right or left respectively of the receiver, and combinations of 63 and 64 or 63 and 65 will result from flashes from cars located approximately on the radial extensions from the baffles 62. The illumination of the corresponding indicators will provide direction information respecting the source of the light flash to the driver observing the indicators 68', 69' and 70'.

FIG. 9 shows a form of short pulse discriminating circuit suitable for the detector 66 of FIG. 7. The circuit of FIG. 9 is connected by lead 72 to one of the photodetectors such as detector 63 to supply a pulse 73 corresponding to the length of the light flash to a differentiating circuit 74. The output of 74 supplies a positive trigger 75 corresponding to the leading edge of pulse 73 to triggering a single-shot 76. The single-shot 76 generates a pulse 77 of predetermined length which is applied as one input to an AND 78. The output of differentiator 74 is inverted in inverter 79 to provide a positive trigger 81 corresponding to the trailing edge of pulse 73 to trigger a second single-shot 82. The output pulse 83 of single-shot 82 supplies the second input to the AND 78. If pulses 77 and 83 overlap, the AND 78 produces an output on lead 84 to trigger one of the indicator channels in the unit 67. The circuit of FIG. 9 is duplicated for the remaining two single channels; and, hence, by controlling the width of the output pulses 77 and 83, the light receiver unit of FIG. 7 is made responsive to light flashes which are shorter than any predetermined duration which preferably corresponds to the length of flashes of light produced by light transmitter unit 14.

Many modifications of the disclosed apparatus will be apparent to those skilled in the art, similarly the parameters chosen can vary within wide limits; for example, the unit 14 can be made economically with an energy output of approximately 100 watt-seconds and a recycling time in the order of 10 seconds. For reliable detection for bright sunlight conditions, however, substantially higher outputs may be desired. This can readily be accomplished as described in connection with FIGS. 5 and 6 and at the cost of somewhat more expensive components.

Due to the nature of human vision, the intensity of the flashes can be increased to extremely high peak values if the duration of the individual flashes is kept extremely short; and as the intensity increases, the duration of the individual flash should be reduced to 1/2,000 second or shorter. With such short flashes, a multiple flash signal can be employed by employing well known stroboscope circuits for generating multiple flashes or any other plural triggering sequence can be used. Such plural triggering sequences obviously require a more elaborate power supply and triggering circuit, but such may be warrented in view of the attention getting quality of a series of two or more flashes in quick succession as opposed to a single flash. In any use of alternate flash sequences such as this, the intensity, the duration, and the periodicity must be selected to avoid the persistent vision effects which produce annoying glare in the vision response of drivers in oncoming traffic.

It is my intention to claim all changes and modifications of the preferred embodiment of my invention herein chosen for purposes of disclosure which do not constitute departures from the spirit and scope of the invention.

What I claim as new and desire to secure by Letters Patent of the United States is:

1. In an automobile, a high intensity light signal warning device comprising a short-duration high-intensity discharge lamp means, means for storing electrical energy, means for energizing said storage means from the electrical system of said automobile to maintain a predetermined energy level, switch means selectively operable by the driver of said automobile for discharging said stored electrical energy into said lamp means, and means for concentrating the light flash from said lamp into a narrow beam directed in a forward direction ahead of said automobile, said beam having an intensity and distribution which will raise the level of illumination within vehicles ahead of and closely adjacent to said automobile sufficiently for visual detection by the occupants of any such vehicles for a substantial majority of normal ambient light levels, said beam intensity and distribution in combination with the short duration of said light flash preventing objectonal visual response in drivers of oncoming traffic vehicles in adjacent traffic lanes.

2. Apparatus according to claim 1 in which said concentrating means forms said beam into a fan-shaped beam wide in the horizontal direction.

3. In an automobile, a high intensity light signal warning device comprising a short-duration high-intensity discarge lamp means, means for storing electrical energy, means for energizing said storage means from the electrical system of said automobile to maintain a predetermined energy level, switch means selectively operable by the driver of said automobile for discharging said stored electrical energy into said lamp means, means for concentrating the light flash from said lamp means into a narrow beam, means for mounting said concentrating means to project said beam forwardly through the windshield of said automobile, and an opaque bezel extending from said concentrating means to the inner surface of said windshield to channel light from said lamp means through said windshield and prevent reflection of light by said windshield into the interior of said automobile.

4. Apparatus according to claim 3 including means for controlling the magnitude of said stored electrical energy and means coupled to the headlight switch of said automobile to operate said last named means for reducing said magnitude when said headlight switch is actuated to energize the headlight of said automobile thereby reducing the intensity of said light flash.

5. In an automobile, a high intensity light signal warning apparatus comprising a light flash device energizable from the electrical system of said automobile, switch means selectively operable by the driver of said automobile for operating said light flash device to produce a high-intensity short-duration light flash, means for concentrating said light flash into a narrow beam, means for mounting said concentrating means to project said beam forwardly through the windshield of said automobile, and an opaque bezel extending from said concentrating means to the inner surface of said windshield to channel said beam through said windshield and prevent reflection of light by said windshield into the interior of said automobile.

References Cited by the Examiner

UNITED STATES PATENTS

| 2,109,184 | 2/1938 | Sereda | 340—88 |
| 2,339,687 | 1/1944 | Doane | 340—74 |
| 3,152,317 | 10/1964 | Mayer | 340—34 |

FOREIGN PATENTS

| 157,021 | 6/1954 | Australia. |
| 161,550 | 3/1955 | Australia. |

NEIL C. READ, *Primary Examiner.*

THOMAS B. HABECKER, *Examiner.*